(12) United States Patent
Sherlekar et al.

(10) Patent No.: US 12,086,523 B2
(45) Date of Patent: Sep. 10, 2024

(54) ADAPTIVE ROW PATTERNS FOR CUSTOM-TILED PLACEMENT FABRICS FOR MIXED HEIGHT CELL LIBRARIES

(71) Applicant: Synopsys, Inc., Mountain View, CA (US)

(72) Inventors: Deepak Dattatraya Sherlekar, Cupertino, CA (US); Victor Moroz, Saratoga, CA (US)

(73) Assignee: Synopsys, Inc., Sunnyvale, CA (US)

( * ) Notice: Subject to any disclaimer, the term of this patent is extended or adjusted under 35 U.S.C. 154(b) by 387 days.

(21) Appl. No.: 17/456,847

(22) Filed: Nov. 29, 2021

(65) Prior Publication Data

US 2022/0180037 A1    Jun. 9, 2022

Related U.S. Application Data

(60) Provisional application No. 63/121,106, filed on Dec. 3, 2020.

(51) Int. Cl.
| | | |
|---|---|---|
| *G06F 30/392* | (2020.01) | |
| *G06F 30/3947* | (2020.01) | |
| *H01L 27/02* | (2006.01) | |
| *G06F 111/20* | (2020.01) | |
| *G06F 119/06* | (2020.01) | |

(52) U.S. Cl.
CPC ........ *G06F 30/392* (2020.01); *G06F 30/3947* (2020.01); *H01L 27/0207* (2013.01); *G06F 2111/20* (2020.01); *G06F 2119/06* (2020.01)

(58) Field of Classification Search
None
See application file for complete search history.

(56) References Cited

U.S. PATENT DOCUMENTS

| | | | | |
|---|---|---|---|---|
| 8,276,109 | B2* | 9/2012 | Penzes | G06F 30/39 716/132 |
| 8,631,377 | B2* | 1/2014 | Lee | G06F 30/392 716/124 |
| 9,007,095 | B2* | 4/2015 | Penzes | H01L 27/11807 326/47 |
| 11,256,844 | B2* | 2/2022 | Ku | H01L 23/528 |
| 2010/0162187 | A1 | 6/2010 | Penzes et al. | |

(Continued)

OTHER PUBLICATIONS

Y.-C. Zhao et al., "A Mixed-Height Standard Cell Placement Flow for Digital Circuit Blocks," Design, Automation and Test in Europe (Date 2019), IEEE, pp. 328-331. (Year: 2019).*

(Continued)

*Primary Examiner* — Leigh M Garbowski
(74) *Attorney, Agent, or Firm* — Patterson + Sheridan, LLP

(57) ABSTRACT

A method includes instantiating a first plurality of rows in a first region of a fabric. The first region has a height corresponding to a sum of heights of the first plurality of rows. The method also includes instantiating a second plurality of rows in a second region of the fabric. The second region is horizontally adjacent to the first region in the fabric. The second region has a height corresponding to a sum of heights of the second plurality of rows. The method further includes determining whether a row of the first plurality of rows is misaligned with a row of the second plurality of rows and adding a transition region between the row of the first plurality of rows and the row of the second plurality of rows in response.

18 Claims, 17 Drawing Sheets

(56) References Cited

U.S. PATENT DOCUMENTS

2010/0289111 A1 11/2010 Lee et al.
2013/0214433 A1 8/2013 Penzes
2023/0401371 A1* 12/2023 Lu .......................... G06F 30/398

OTHER PUBLICATIONS

International Search Report and Written Opinion, International Application No. PCT/US2021/061021, consists of 14 pages.
International Report on Patentability, International Application No. PCT/US2021/061021, dated Jun. 15, 2023 consists of 8 pages.

* cited by examiner

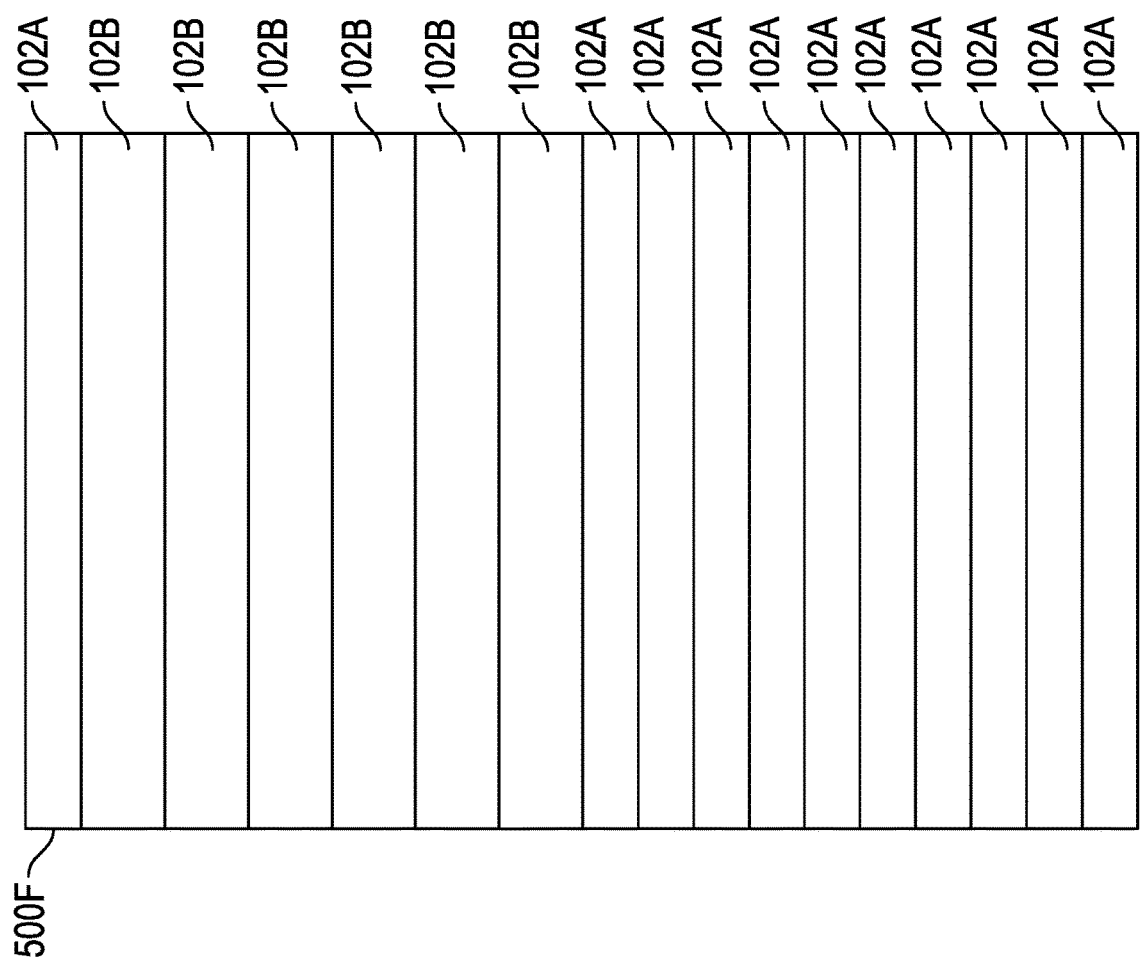
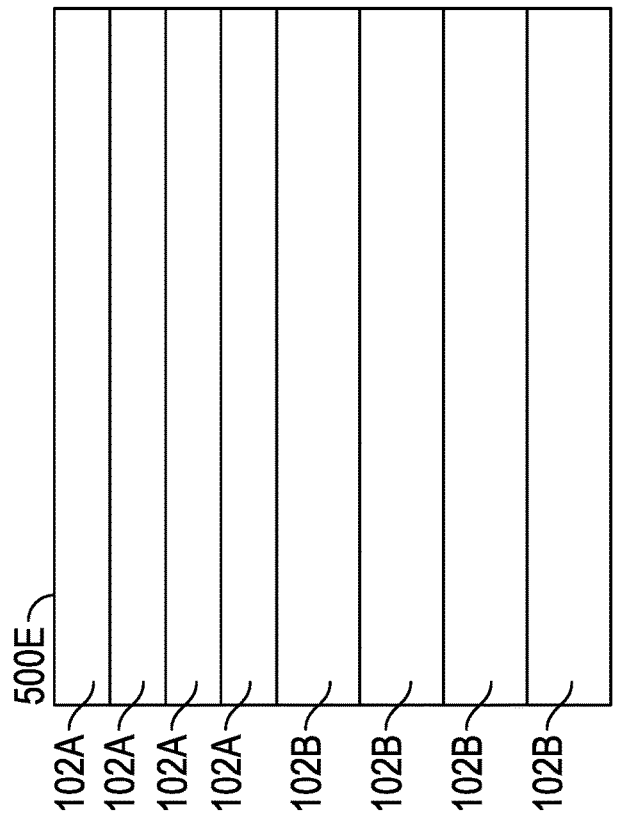

ADAPTIVE ROW PATTERNS FOR CUSTOM-TILED PLACEMENT FABRICS FOR MIXED HEIGHT CELL LIBRARIES

CROSS-REFERENCE TO RELATED APPLICATIONS

This application claims priority to and the benefit of U.S. Provisional Patent Application Ser. No. 63/121,106, entitled "Floorboards: Adaptive row patterns for custom-tiled placement fabrics for mixed height cell libraries," filed Dec. 3, 2020, which is incorporated herein by reference in its entirety.

TECHNICAL FIELD

The present disclosure relates to semiconductor device design, and more specifically, relates to adaptive fabrics for cell-based design using different height cells.

BACKGROUND

One step in the semiconductor device design process is the placement of transistor cells into a chip design. This step allows a user to see if the transistor cells fit within the physical boundaries of the chip. To assist in the placement of the transistor cells, the user may use a chip fabric that divides the chip into multiple rows that fit transistor cells. The user may then insert transistor cells into these rows.

As semiconductor processes approach end of scaling, device performance is improving faster than interconnect performance. As a result, cell height shrank faster than metal pitch (MP). A general purpose cell library in planar nodes was 9 MPs tall from around the 500 nanometer (nm) process node through 28 nm. A high performance library was 12 MP, and an ultra-high density library was 7 MP. Cell heights in the first fin field effect transistor (finFET) nodes dropped to about 7.5 MP for general purpose and to 10.5 MP for high performance. Ultra-high density libraries were not possible because metal pitch was not tight enough to allow compact cell layouts and good pin access. By 7 nm, the general purpose library height was 6 MP while the high performance library was 7.5-8 MP.

Cell-based designs from planar through the first finFET node had the cells in a block conform to cell rows of uniform height. Taller complex cells were multiples of the row height and were placed in the same rows as single height cells. The restriction enabled common power and ground rails to be shared by the cells in a block.

Small devices on non-critical paths helped minimize power consumption. When they are placed next to large devices, however, they alter the timing or power characteristics of the large devices. In older nodes, the impact was negligible. As the impact grew bigger, it was prevented by spacing apart cells with different device sizes. The spacing requirement in the $4^{th}$ or $5^{th}$ generation finFET nodes is too large to be practical, forcing the cells in a row to use maximum device sizes. This constraint caused power consumption in high performance libraries to skyrocket, because they employ taller cells with larger devices.

Cell-based design using a fabric consisting of a repeating pattern of different height cell rows has been proposed to address the problem of high power consumption. Examples of such patterns may use cell libraries of height 5MP, 7.5MP, and 10MP. Each cell row spans the width of the block, with possible breaks in the rows to accommodate hierarchical sub-blocks or hard macros such as memories. The shortest possible cells use transistors with one N fin and one P fin, and medium performance cells may use transistors with two N fins and two P fins. High performance cells may use higher fin count devices. Taller cells are also easier to route in a congested design. The blocks on a chip may include patterns most closely matching their needs in terms of performance, power, and routing congestion. Thus, high performance blocks or blocks with high congestion may choose a higher proportion of tall cell rows with large devices, while easy to route lower performance blocks may select patterns having a higher proportion of short rows with smaller devices. The construction is not limited to finFET nodes, and may be applied equally effectively to older planar nodes, and to future nodes employing other transistor architectures such as gate-all round, fork sheet, or complementary field effect transistor (CFET).

A significant limitation of the current practice is that cell rows of any given height extend the width of the block, with possible cut-outs to accommodate hard macros. This limits the ability to modulate space allocated to cells of differing device sizes (hence of different heights) only in the y-dimension. However, semiconductor chips are two-dimensional and the ability to modulate the proportion of rows of differing heights in both x and y dimensions is need in some designs. If a user places cells without regard to the underlying row pattern, different regions of the block will require different proportions of cells of different height. These regions are distributed in two dimensions over the entire block and do not conform to the one-dimensional tiling of the block with different height rows spanning the entire block.

SUMMARY

According to an embodiment, a method for designing a chip fabric includes instantiating a first plurality of rows in a first region of a fabric. The first region has a height corresponding to a sum of heights of the first plurality of rows. The method also includes instantiating a second plurality of rows in a second region of the fabric. The second region is horizontally adjacent to the first region in the fabric. The second region has a height corresponding to a sum of heights of the second plurality of rows. The method further includes determining, by a processing device, whether a row of the first plurality of rows is misaligned with a row of the second plurality of rows and adding a transition region between the row of the first plurality of rows and the row of the second plurality of rows in response to determining that the row of the first plurality of rows is misaligned with the row of the second plurality of rows.

The height of the second region may be at least twice the height of the first region. A first set of rows of the first plurality of rows in a first portion of the second region may have a first width, and a second set of rows of the first plurality of rows in a second portion of the second region may have a second width different from the first width. A height of the first portion of the second region may be equal to the height of the first region The method may also include removing a transition region between a set of rows in the first region and a set of rows in the second region in response to a determination that the set of rows in the first region and the set of rows in the second region are aligned.

The method may further include instantiating a third plurality of rows in a third region of the fabric. The third region may be above the second region in the fabric. The third region may have a height equal to the height of the first region. A row of the third plurality of rows and a row of the second plurality of rows may have different heights.

The method may also include instantiating a set of transistors into the first plurality of rows.

The height of the second region may be an integral multiple of the height of the first region.

The row of the first plurality of rows may have a height that is different from a height of the row of the second plurality of rows.

A first cell in a first row of the first plurality of rows may be arranged to connect to a global power rail using a power rail local to the first plurality of rows, and a second cell in a second row of the second plurality of rows may be arranged to connect to the global power rail using a power rail local to the second plurality of rows.

According to another embodiment, system for designing a chip fabric includes a memory and a hardware processor communicatively coupled to the memory. The hardware processor instantiates a first plurality of rows in a first region of a fabric. The first region has a height corresponding to a sum of heights of the first plurality of rows. The hardware processor also instantiates a second plurality of rows in a second region of the fabric. The second region is horizontally adjacent to the first region in the fabric. The second region has a height corresponding to a sum of heights of the second plurality of rows. The hardware processor also determines, by a processing device, whether a row of the first plurality of rows is misaligned with a row of the second plurality of rows and adds a transition region between the row of the first plurality of rows and the row of the second plurality of rows in response to determining that the row of the first plurality of rows is misaligned with the row of the second plurality of rows.

The height of the second region may be at least twice the height of the first region. A first set of rows of the first plurality of rows in a first portion of the second region may have a first width, and a second set of rows of the first plurality of rows in a second portion of the second region may have a second width different from the first width. A height of the first portion of the second region may be equal to the height of the first region.

The hardware processor may also remove a transition region between a set of rows in the first region and a set of rows in the second region in response to a determination that the set of rows in the first region and the set of rows in the second region are aligned.

The hardware processor may further instantiate a third plurality of rows in a third region of the fabric, the third region above the second region in the fabric, the third region having a height equal to the height of the first region. A row of the third plurality of rows and a row of the second plurality of rows may have different heights.

The hardware processor may also instantiate a set of transistors into the first plurality of rows.

The height of the second region may be an integral multiple of the height of the first region.

The row of the first plurality of rows may have a height that is different from a height of the row of the second plurality of rows.

According to another embodiment, a non-transitory computer readable medium stores instructions that, when executed by a processor, cause the processor to perform an operation for designing a chip fabric. The operation includes instantiating a first plurality of rows in a first region of a fabric, instantiating a second plurality of rows in a second region of the fabric horizontally adjacent to the first region in the fabric, and adding a transition region between a row of the first plurality of rows and a row of the second plurality of rows in response to determining that the row of the first plurality of rows is misaligned with the row of the second plurality of rows.

A height of the second region may be at least twice a height of the first region. A first set of rows of the first plurality of rows in a first portion of the second region may have a first width, and a second set of rows of the first plurality of rows in a second portion of the second region may have a second width different from the first width.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 5A, 5B, 5C, 5D, 5E, and 5F illustrate a fourth set of example floorboards for a chip fabric, in accordance with an embodiment of the present disclosure.

DETAILED DESCRIPTION

Aspects of the present disclosure relate to adaptive fabrics for cell-based design using different height cells. Specifically, this disclosure describes a chip fabric that is divided into multiple regions. Each region may use a pattern of rows, called a floorboard, from a set of compatible floorboards that is designed to define the row patterns in different regions in the chip fabric. Stated differently, this disclosure describes an alternative customizable fabric for mixing different height cells in the same logic block.

Generally, the alternative fabric allows customization of proportions of different height rows in two dimensions within the same block. The fabric allows a user to customize the row pattern in different regions of the block to match the needs of the placement of cells in that region. This fabric is applicable to planar and finFET processes as well as future processes such as gate all round and fork-sheets. An EDA system (e.g., the computer system 1200 of FIG. 12 implemented to perform the processes 1100 of FIG. 11) may use the fabric and perform the processes described herein.

As a result, the alternative fabric allows circuit designers to modulate the space allocated to cells of differing device sizes in different dimensions, in certain embodiments. Additionally, the alternative fabric may include transition regions that separate adjacent floorboards with misaligned rows. In this manner, floorboards with different row heights may be positioned adjacent to each other in the fabric.

Figure 1A:
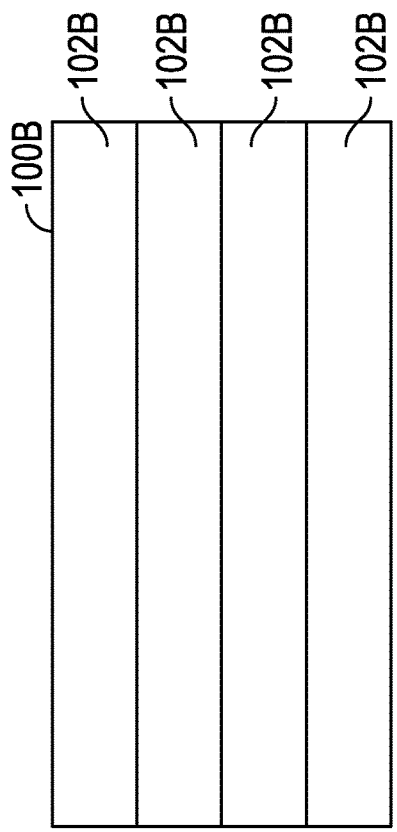
FIGS. 1A, 1B, 1C, 1D, and 1E illustrate example building blocks, called floorboards, which are used to design a chip fabric, in accordance with an embodiment of the present disclosure.
Figure 1B:
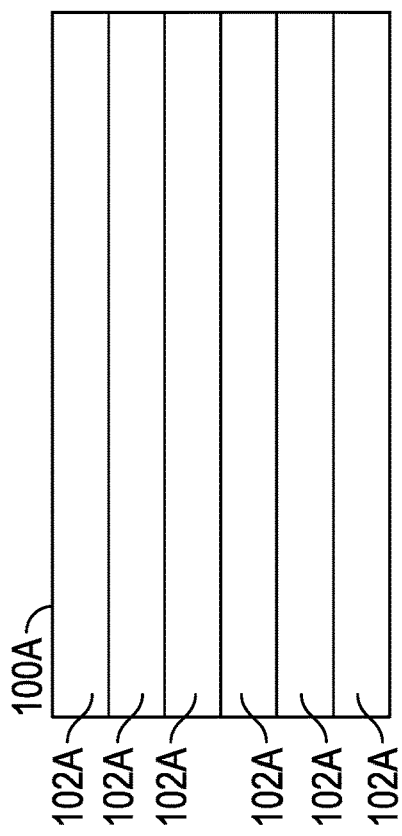
Figure 1C:
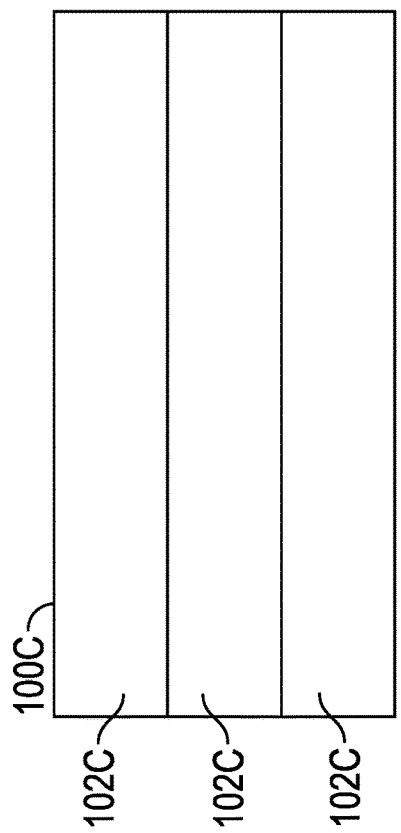
Figure 1D:
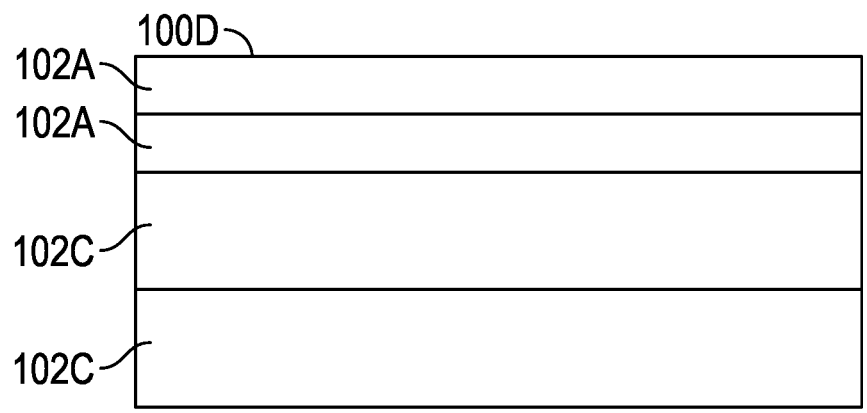
Figure 1E:
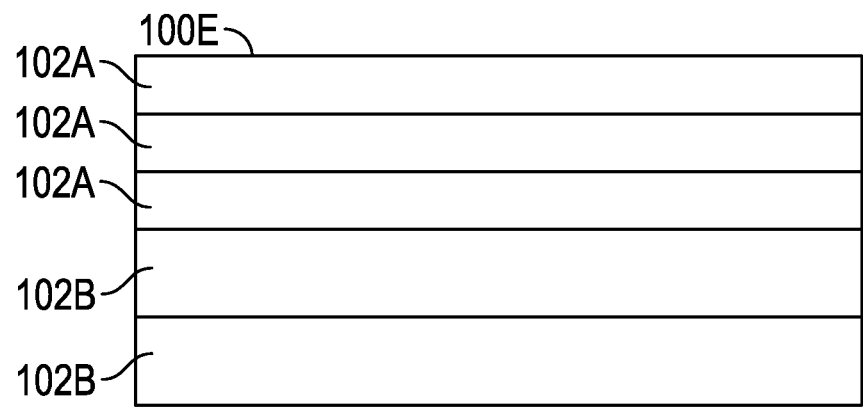

Given a block to be implemented with cells designed for rows of different heights, different floorboards consisting of multiple vertically abutted rows may be defined such that the sum of the heights of the rows in each floorboard is the same. Rows in a floorboard may have the same height or different heights. FIGS. 1A, 1B, 1C, 1D, and 1E illustrate floorboards of height 30MP made up of rows of 5MP, 7.5MP and 10MP heights, where MP is the pitch of the 2nd horizontal routing layer above the devices. All rows in the floorboards in FIGS. 1A, 1B, and 1C are of the same height, while the floorboards in FIGS. 1D and 1E are made up of rows of different height. As seen in FIG. 1A, the floorboard 100A includes six rows 102A with 5MP height. In FIG. 1B, the floorboard 100B includes four rows 102B with 7.5MP height. In FIG. 1C, the floorboard 100C includes three rows 102C of 10MP height. In FIG. 1D, the floorboard 100D includes two rows 102A of 5MP height and two rows 102C of 10MP height. In FIG. 1E, the floorboard 100E includes three rows 102A of 5MP height and two rows 102B of 7.5MP height. The floorboards 100A, 100B, 100C, 100D, and 100E each have a height of 30MP.

For a given set of floorboards of matching height, the placement fabric for the block consists of disjoint rectilinear regions, each constructed from one floorboard. The rectilinear regions may observe the following constraints:

1. The height of any segment of the rectilinear region is an integral multiple of the common floorboard height. Thus, each vertical edge of the rectilinear region is also an integral multiple of the common floorboard height.

2. The width of any segment of the rectilinear region may be different, conforming to the granularity of width imposed by the process.

3. Horizontally adjacent regions of different floorboards are separated by a transition region. The transition region is implemented with custom boundary cells to address the mismatch in features such as diffusions, wells, and power and ground rails.

Figure 2:
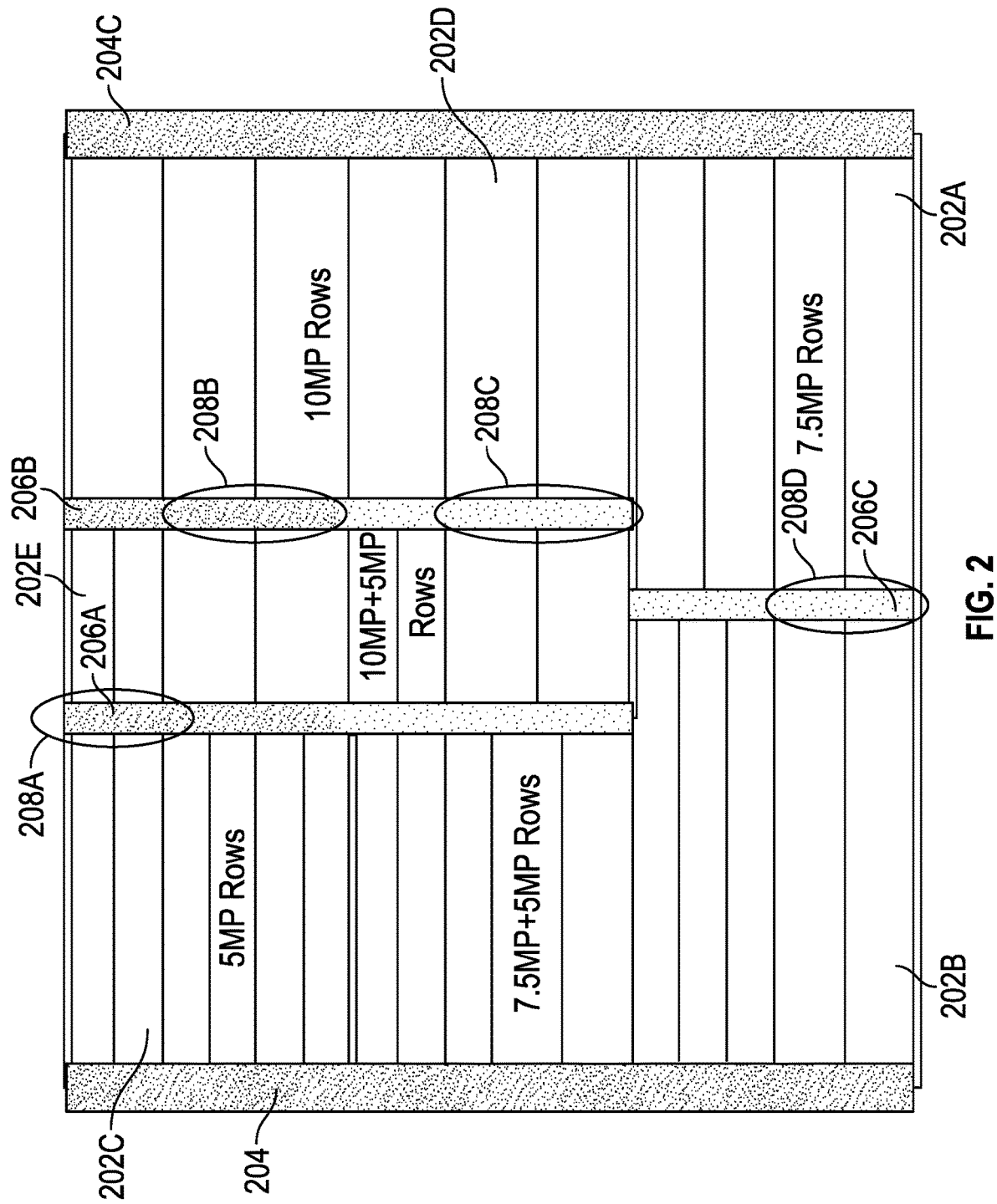
FIG. 2 illustrates an example chip fabric that includes multiple regions of different width and height formed with the floorboards of FIGS. 1A, 1B, 1C, 1D, and 1E, in accordance with an embodiment of the present disclosure.

FIG. 2 illustrates an example chip fabric 200 implemented using the floorboards 100 of FIGS. 1A, 1B, 1C, 1D, and 1E as building blocks for different rectilinear regions in the fabric 200. As seen in FIG. 2, the fabric 200 is divided into five different regions 202A, 202B, 202C, 202D, and 202E, each using a different floorboard 100 to create its rows. Each region 202 has a height that is an integer multiple of 30MP. The region 202A uses the floorboard 100B of FIG. 1B that includes four rows 102B of 7.5MP each for a height of 30MP. The region 202B uses the floorboard 100E of FIG. 1E that includes two rows 102B of 7.5MP each and three rows 102A of 5MP each. Additionally, the region 202B includes two instances of the floorboard 100E such that the height of the region 202B is 60MP rather than 30MP. Furthermore, the two instances of the floorboard 100E in the region 202B have different widths. As seen in FIG. 2, the floorboard 100E on the bottom half of the region 202B is wider than the floorboard 100E on the top half of the region 202B. The region 202C includes the floorboard 100A of FIG. 1A that includes six rows 102A of 5MP each for a height of 30MP. The region 202D includes the floorboard 100C of FIG. 1C that includes three rows 102C of 10MP each. Additionally, the region 202C includes two instances of the floorboard 100C such that the height of the region 202C is 60MP rather than 30MP. The region 202E includes the floorboard 100D of FIG. 1D that includes two rows 102C of 10MP each and two rows 102A of 5MP each. Additionally, the region 202E includes two instances of the floorboard 100D such that the height of the region 202E is 60MP rather than 30MP. Importantly, as seen in FIG. 2, the regions 202 have a height that is an integer multiple of 30MP. The regions 202 may have any suitable relative heights. For example, one region 202 may have a height that is double the height of another region 202, triple the height of another region 202, or more. Additionally, the regions 202 have widths that are adjusted to be different.

The fabric 200 also includes row endcaps 204 on the sides of the fabric 200 that separate the fabric 200 from other fabrics in a design. Moreover, the different regions 202 in the fabric 200 may be separated from each other by transition regions 206. The transition region 206A separates the regions 202B and 202C from the region 202E. The transition region 206B separates the region 202E from the region 202D. The transition region 202C separates the region 202B from the region 202A. In certain embodiments, an EDA system (e.g., the computer system 1200 of FIG. 12 implemented to perform the processes 1100 of FIG. 11) deletes portions 208 of the transition regions 206 when the rows 102 on either side of that portion align (e.g., the rows are the same height and are co-linear). For example, the EDA system may delete portions 208A, 208B, 208C, and 208D because the rows on either sides of these portions 208A, 208B, 208C, and 208D are the same height and are co-linear such that these rows align with each other.

The transition regions 206 may be designed using patterning simulations and device simulations to account for layout proximity effects. The effectiveness of the transition regions 206 may be verified with test chips. The transition regions 206 may be implemented during chip design with custom boundary cells, which allow misaligned cell power and ground rails to be patterned properly and connected to a global power grid, and patterns for horizontal metal on lower levels, which may not align across the regions. The boundary cell may also serve to transition device layers, such as diffusion between the two regions.

The width of the transition region 206 is determined based on the requirements of the transition patterns to be implemented. Transition regions 206 add overhead to the design. Hence, the size of the transition regions 206 may suggest additional restrictions on the minimum width of the rectilinear regions 202 to ensure efficient utilization of available space.

The height of any vertical span of a rectilinear region 202 is a multiple of the height of the floorboards 100 in that region 202. The region 202 may also need to meet additional process related design rules. For example, if the process rules require an even number of rows of each height, then the floorboards 100E and 100C in regions 202B and 202D may need to be changed. For example the floorboard 100E in the region 202B may need to be changed to sets of floorboards 100A in FIGS. 1A and 100B in FIG. 1B. As another example, the floorboard 100C in the region 202D may be replaced with a floorboard 100 that includes six rows 102C of 10MP each.

The width of any region 202 may also need to meet the requirements of the process. For example, the process may require each row fragment in the rectilinear region 202 to be an even multiple of the contacted poly pitch.

The above floorboard construction is illustrated using metal pitch of the second horizontal layer above devices. Such a construction assumes that the pitch of this layer is the same across different cell heights. This is a reasonable assumption for efficient routing of global signals within a block, because it enables tracks for that layer to span the entire block, allowing connections to pins in cells of different heights. Similarly, for efficiency of global routes, the first routable horizontal layer above the cells may need to be routable. In this case, the first metal pitch is also the same for different cell heights. The pattern also assumes the gate pitch (e.g., contacted poly pitch (CPP)) is also the same for different cell types. This too is a reasonable assumption for optimal manufacturing. However, none of these assumptions are strictly required, but are either dependent on process design rules or efficiency of optimizing block design. For example, if the library architecture does not require the second horizontal layer to be used for global routing, then the pitch of the second horizontal layer may be different in different floorboards 100. The absolute height of floorboards 100 in a pattern may still be identical, or integer multiples of a common height.

Once a set of compatible floorboards 100 of matching height are defined, the fabric 200 can be divided into disjoint rectangular regions 202 using the floorboards 100. The size and shape of each region 202 is defined to meet the needs of the cells expected to be placed there. The regions 202 may be rectilinear polygons instead of simple rectangles, where the height of each vertical leg of the rectilinear polygon is an integer multiple of the common floorboard height.

In certain embodiments, the EDA system may use custom transition cells or regions 206 matching the common floorboard height for every unique pair of floorboards 100. So if there are N floorboards 100, there are 0.5*N*(N-1) transition cells or regions 206. Floorboards 100 which have the same height and the same proportion of different rows 102, but different order of the rows 102 are considered to be distinct floorboards 100. For example, consider floorboard 100D of FIG. 1D with two 10MP rows 102C and two 5MP rows 102A. One may define the following floorboards 100 with the same proportion of rows 102 but different order: a floorboard 100 with alternating rows 102A and 102C (5MP, 10MP, 5MP, 10MP) and a floorboard with a reverse ordering of alternating rows 102A and 102C (10MP, 5MP, 10MP, 5MP).

FIGS. 3A, 3B, 3C, 4A, 4B, 4C, 5A, 5B, 5C, 5D, and 5E illustrate examples of floorboards with different heights. These examples show that floorboards of any suitable height may be used in the described fabrics.

Figure 3A:
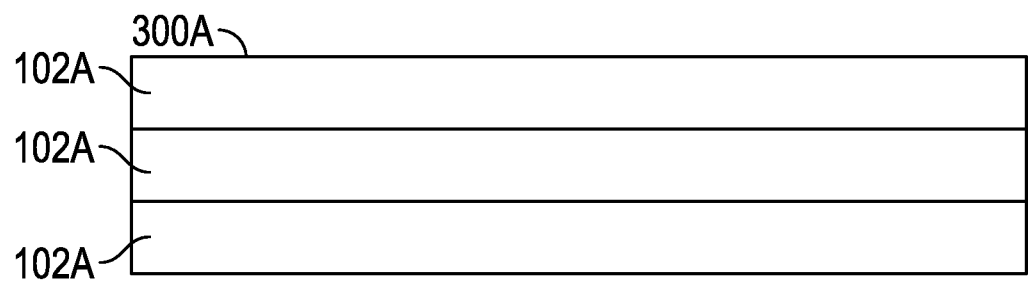
FIGS. 3A, 3B, and 3C illustrate a second set of example floorboards for a chip fabric, in accordance with an embodiment of the present disclosure.
Figure 3B:
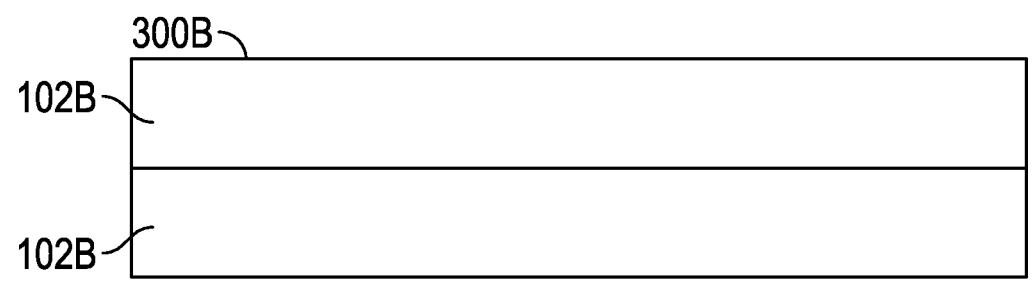
Figure 3C:
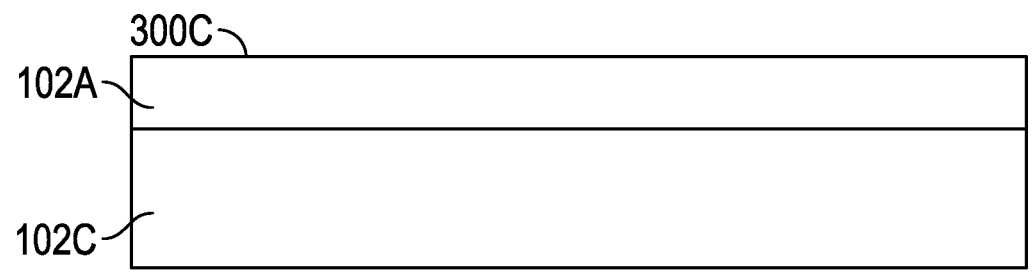

FIGS. 3A, 3B, and 3C illustrate example floorboards 300 with a 15MP height. Floorboard 300A in FIG. 3A includes three rows 102A of 5MP each. Floorboard 300B in FIG. 3B includes two rows 102B of 7.5MP each. Floorboard 300C in FIG. 3C includes one row 102C of 10MP and one row 102A of 5MP.

Figure 4B:
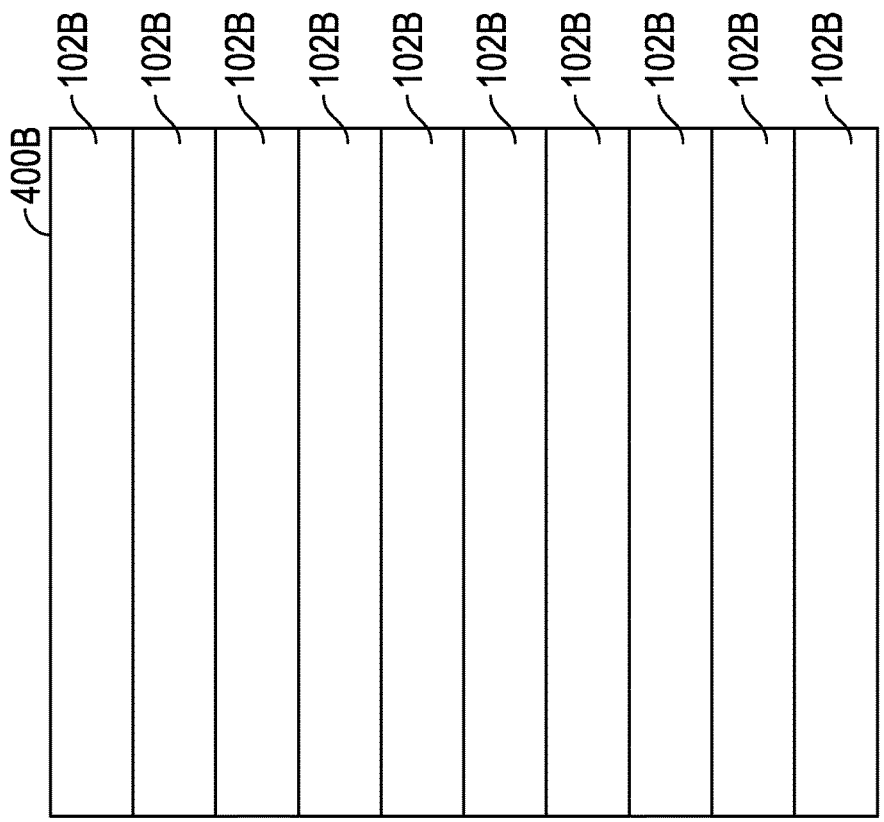
FIGS. 4A, 4B, and 4C illustrate a third set of example floorboards for a chip fabric, in accordance with an embodiment of the present disclosure.
Figure 4A:
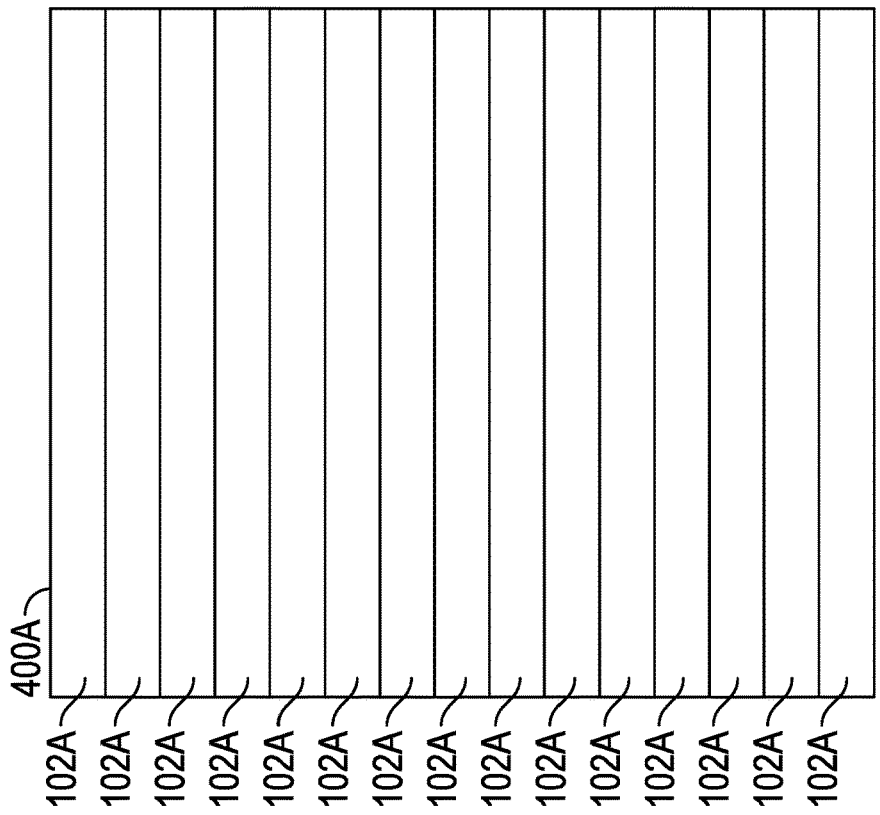
Figure 4C:
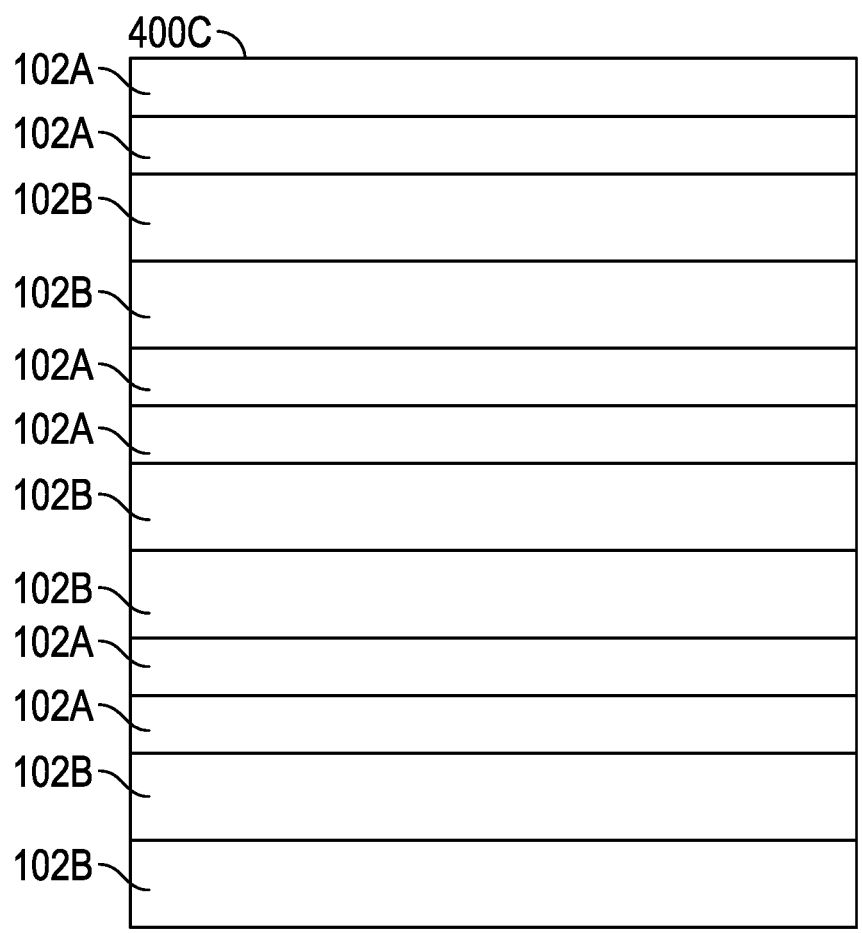

FIGS. 4A, 4B, and 4C illustrate example floorboards 400 with a 75MP height. Floorboard 400A in FIG. 4A includes fifteen rows 102A of 5MP each. Floorboard 400B in FIG. 4B includes ten rows 102B of 7.5MP each. Floorboard 400C in FIG. 4C includes six rows 102B of 7.5MP each and six rows 102A of 5MP each.

Figure 5B:
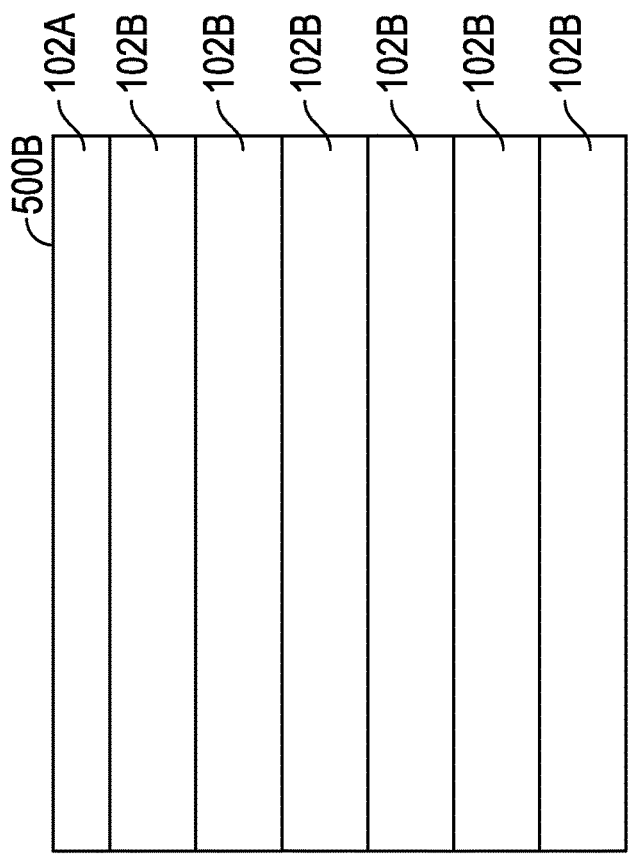
Figure 5A:
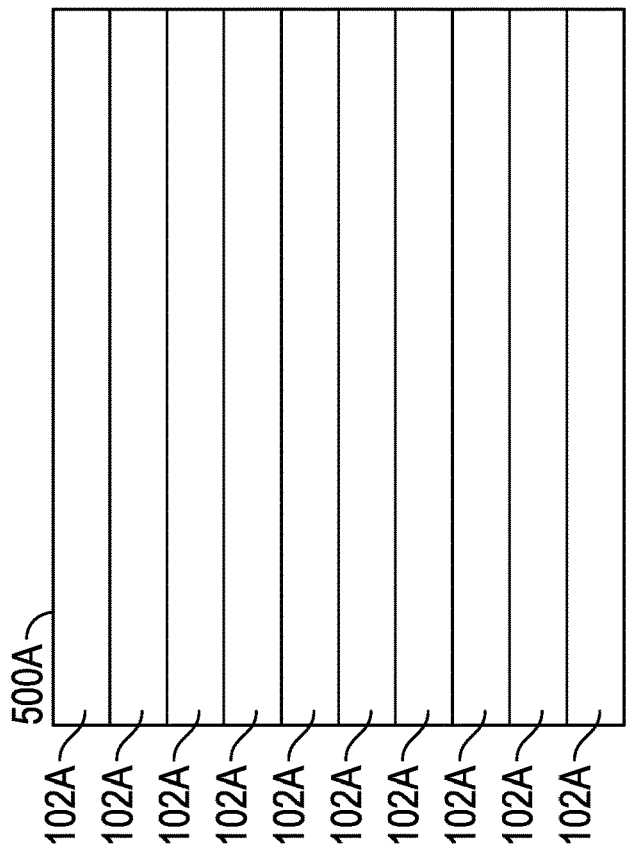
Figure 5D:
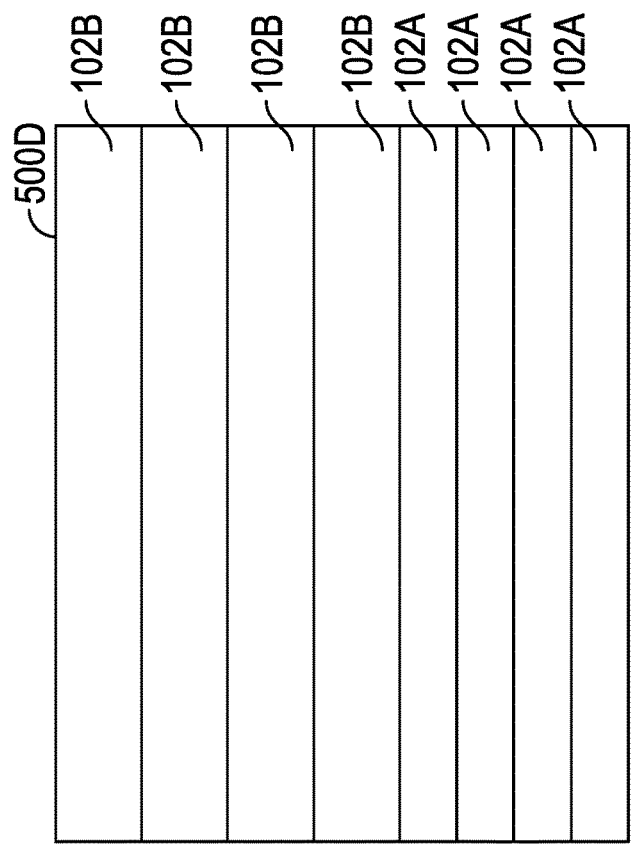
Figure 5C:
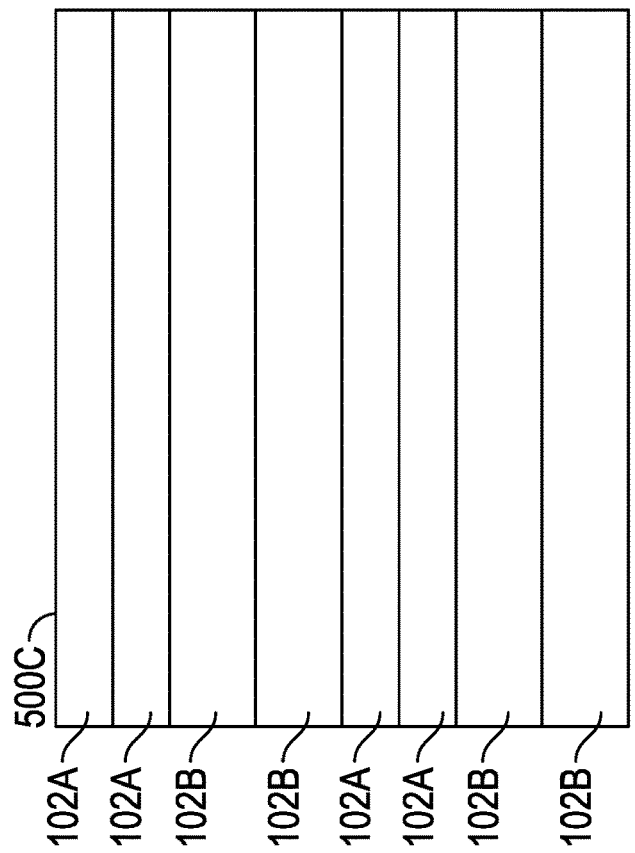

FIGS. 5A, 5B, 5C, 5D, and 5E illustrate example floorboards 500 with a 50MP height. Floorboard 500A in FIG. 5A includes ten rows 102A of 5MP each. Floorboard 500B in FIG. 5B includes six rows 102B of 7.5MP each and one row 102A of 5MP. Floorboard 500C in FIG. 5C includes four rows 102B of 7.5MP each and four rows 102A of 5MP each. FIGS. 5D and 5E also include four rows 102B of 7.5MP each and four rows 102A of 5MP each, but the order of the rows is different. Floorboard 500D in FIG. 5D includes four rows 102B of 7.5MP each on top of four rows 102A of 5MP each. Floorboard 500E in FIG. 5E includes four rows 102A or 5MP each on top of four rows 102B of 7.5MP each. Thus, the permutations of the rows result in new floorboards.

Additionally, larger floorboards 500 may be designed using smaller floorboards 500, such that the heights of the larger floorboards 500 are multiples of the height of the smaller floorboards 500. For example, if the floorboard height of 50MP shown in FIGS. 5A, 5B, 5C, 5D, and 5E is the smallest floorboard height, then larger floorboards with heights of 100MP, 150MP, etc., may be designed using the 50MP floorboards. FIG. 5F illustrates an example floorboard 500F that is formed using the floorboard 500A shown in FIG. 5A and the floorboard 500B shown in FIG. 5B. The floorboard 500F has ten rows 102A of 5MP each, six rows 102B of 7.5MP each, and another row 102A of 5MP.

Figure 6:
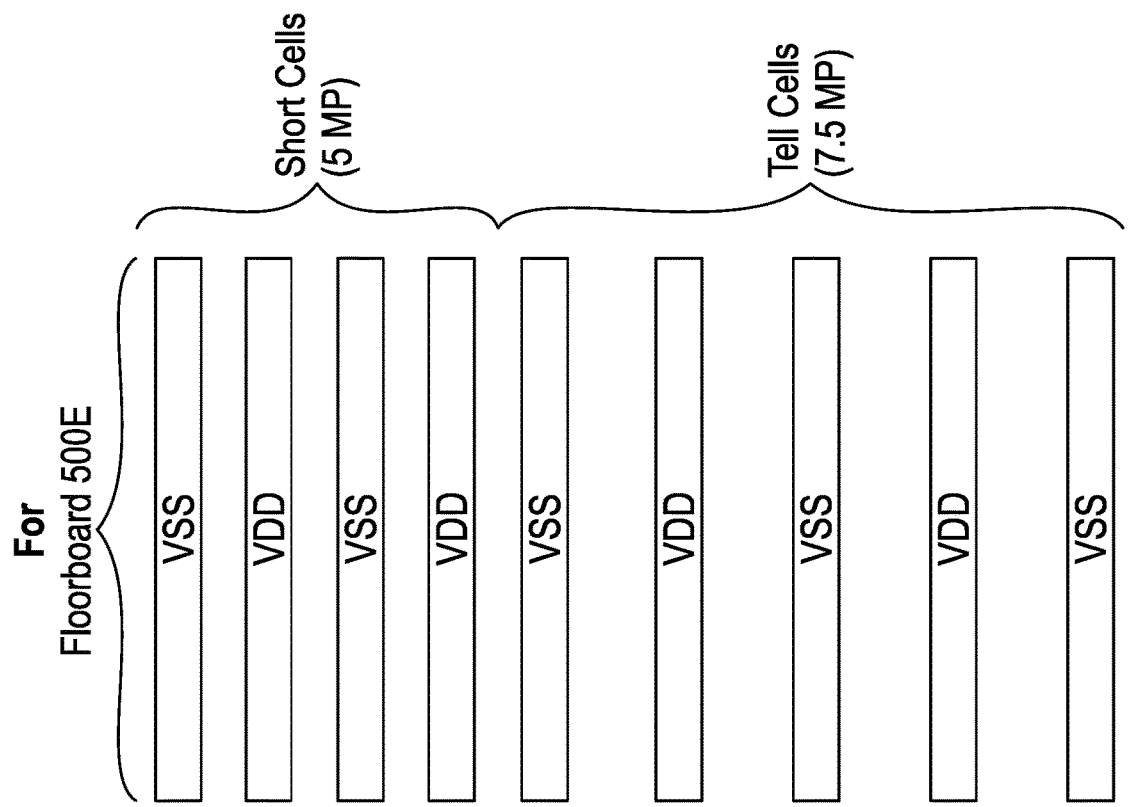
FIG. 6 illustrates a backside power distribution with a first layer of backside power rails (BSPR) for two instances of floorboards placed next to each other, in accordance with an embodiment of the present disclosure.
Figure 6:
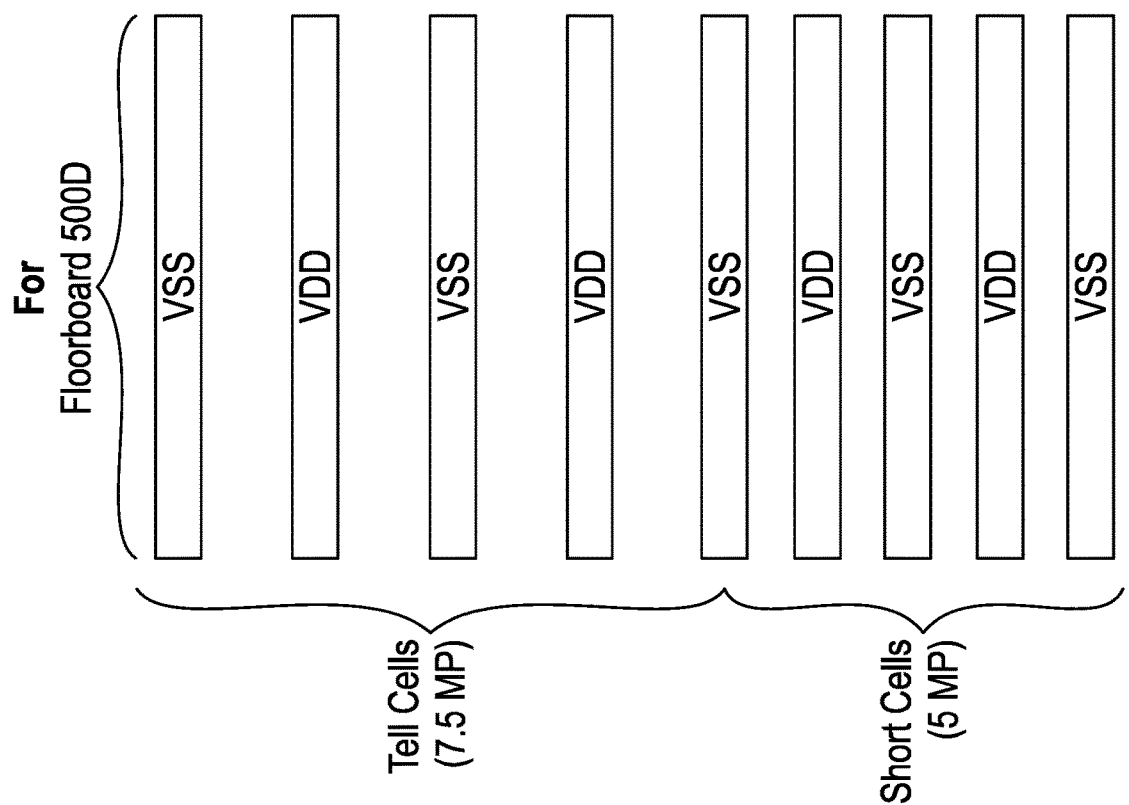

In many implementations of chips, vertically adjacent rows are alternately flipped and abutted. This allows vertically adjacent rows to share power or ground rails for cells placed in them. This is the case with the power rails in FIGS. 6 and 7. As with the row height, the row orientation is a distinguishing feature of the floorboard. If the orientations of the rows in the floorboards of FIG. 6 are flipped, the top and bottom rails of the pattern become VDD instead of VSS. The resulting pattern has the same sequence of row heights, but different row orientation, and is considered a distinct floorboard.

Processes using conventional power rails to supply power to cells include tap cells inserted at periodic intervals to prevent latch-up problems. In this case, it may be efficient to integrate the tap cells into the custom cells implementing transition regions 206, further increasing the size of the transition regions 206. The range and size of tap cells may indicate additional considerations on widths of rectilinear regions 202.

Figure 7:
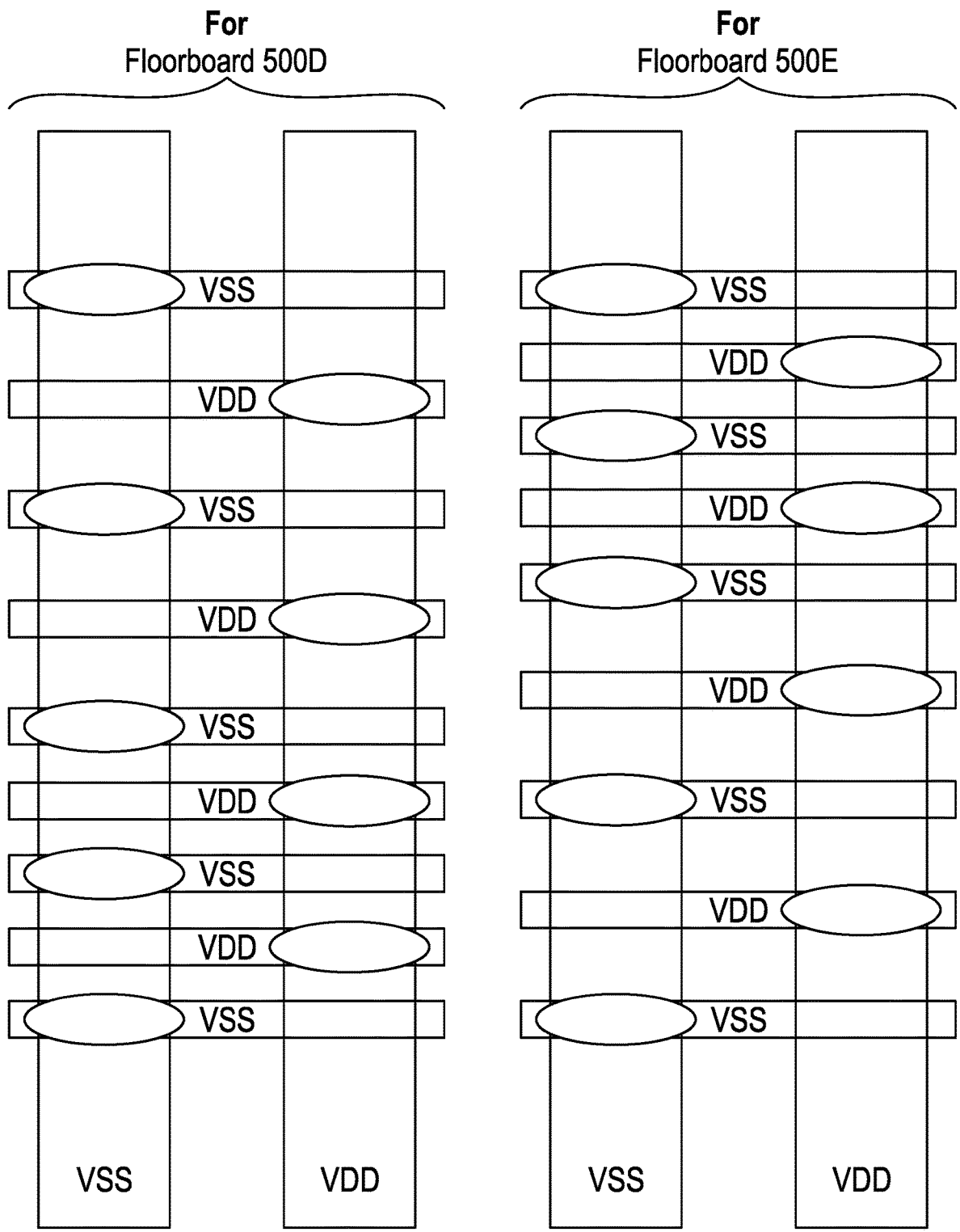
FIG. 7 illustrates the backside power distribution of FIG. 6 with a second layer of vertical power straps connecting the first layer of BSPR, in accordance with an embodiment of the present disclosure.
Figure 8:
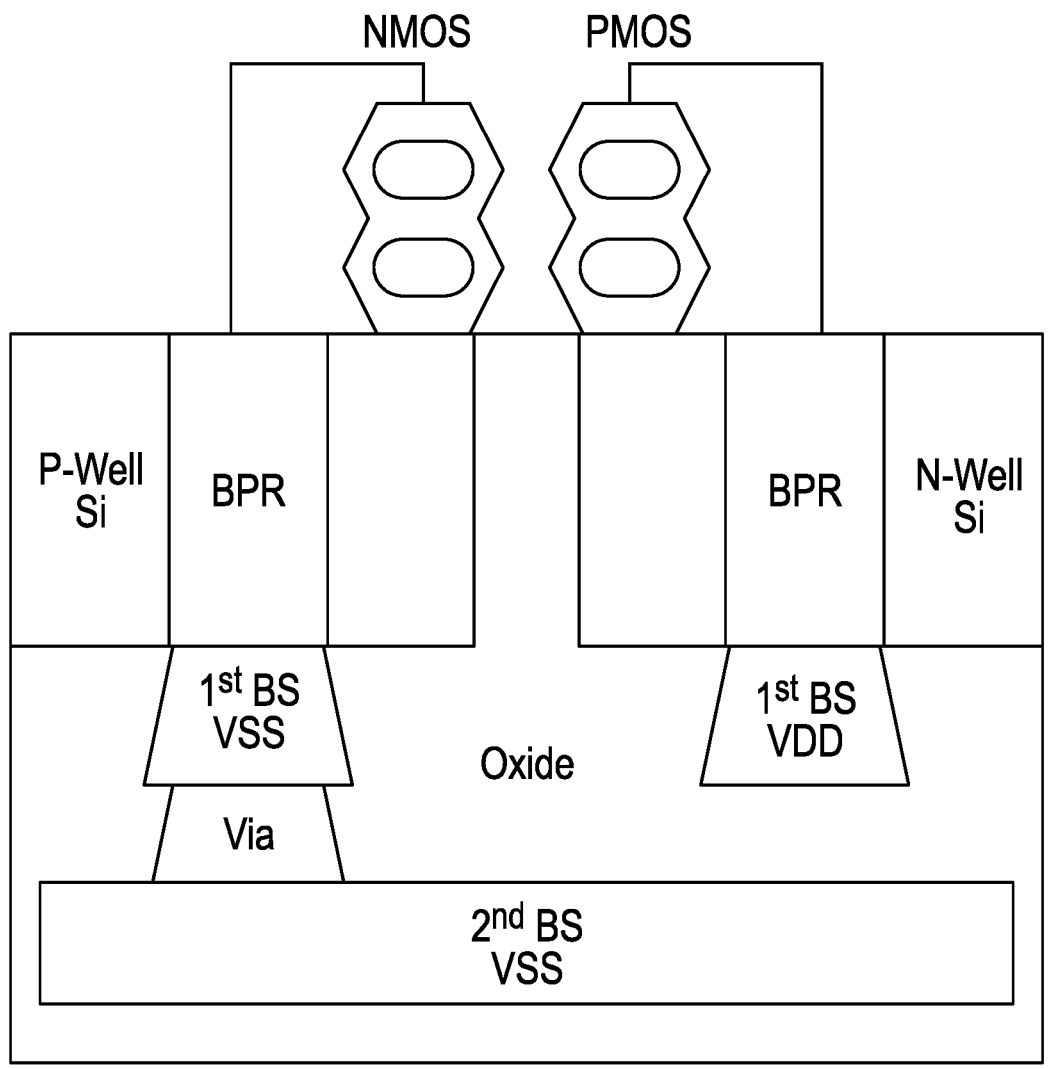
FIG. 8 illustrates a cross section of the backside power distribution scheme of FIG. 7 for a die that does not include a through silicon via (TSV), in accordance with an embodiment of the present disclosure.
Figure 9A:
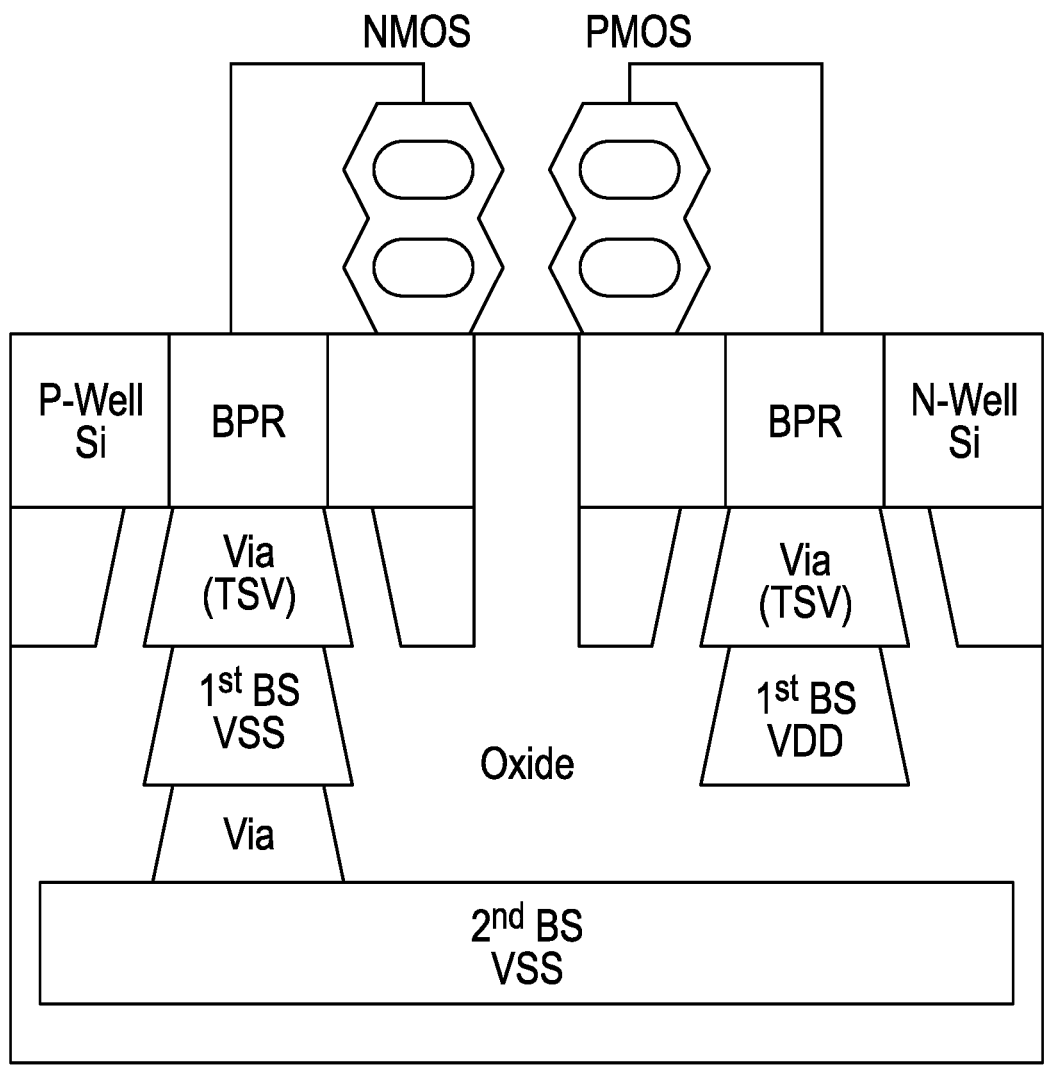
FIGS. 9A and 9B illustrate example chips with the backside power distribution scheme of FIG. 7 for a thicker die that includes TSVs, in accordance with an embodiment of the present disclosure.
Figure 9B:
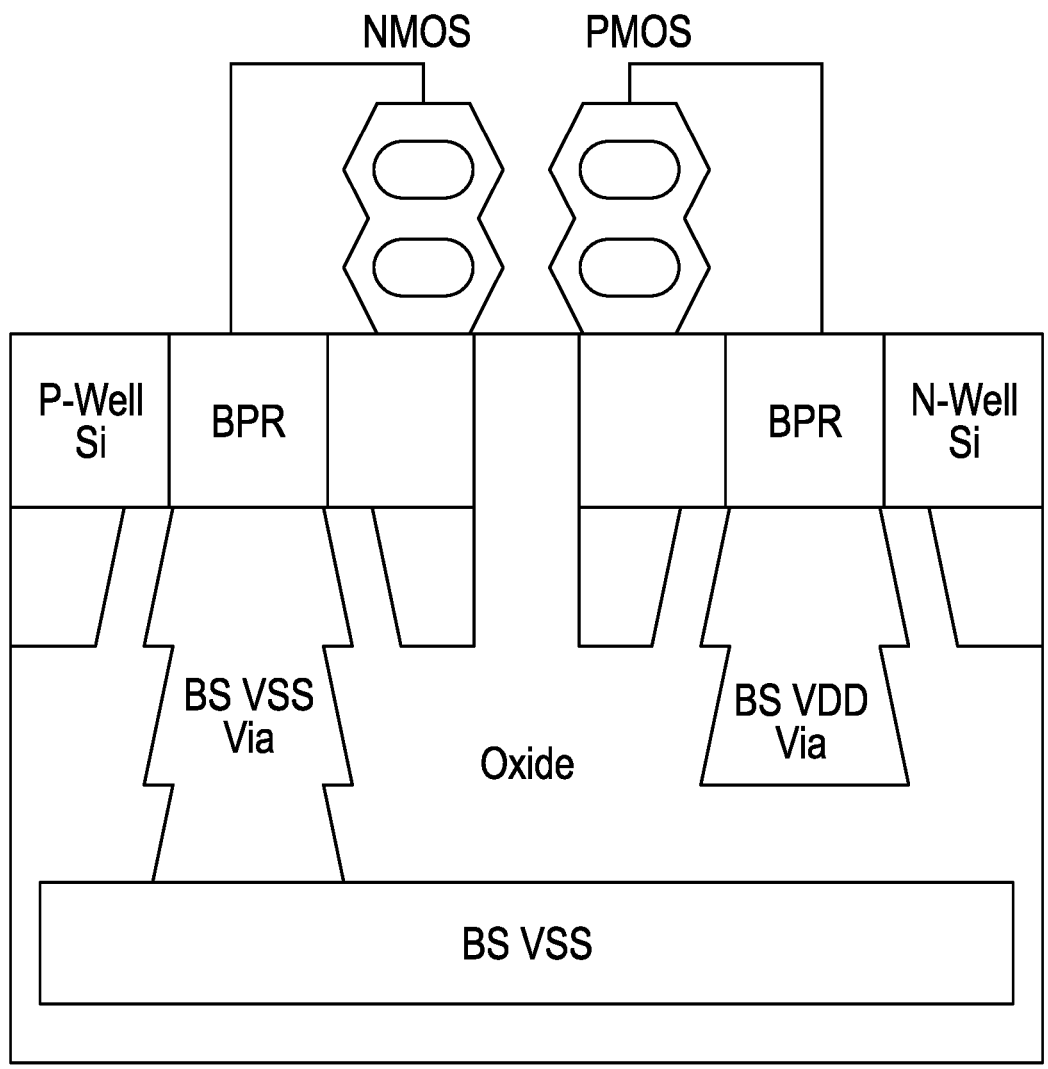

FIGS. 6, 7, 8, 9A, and 9B illustrate processes that use backside power distribution and buried power rails (BPR). These processes may not need dedicated cells to make tap connections. For such processes, the transition regions 206 can be as small as two to four grids, assuming well proximity effects are negligible. With small transition regions 206, the proposed construction becomes even more efficient with little overhead. FIG. 6 illustrates the backside distribution of a first layer of power rails for the cells in different regions 202. As seen in FIG. 6, the first layer of backside power rails may correspond to regions 202 that use floorboard 500D in FIG. 5D and floorboard 500E in FIG. 5E. FIG. 7 illustrates power straps connecting the power rails in FIG. 6. The straps and backside power rails shown in FIGS. 6 and 7 are local to the floorboards 500D and 500E positioned above the straps and backside power rails. Stated differently, cells positioned in the floorboards 500D and 500E may connect to the local straps and/or backside power rails. FIGS. 8, 9A, and 9B show a cell connected to a backside power rail of a first layer and a backside power rail of a second layer. These cells include BPRs that connect to the first layer of backside power rails and straps, which are local to the floorboards in which these cells are positioned. A through silicon via (TSV) may be used to connect the BPR to the first layer of backside power rails and straps. The first layer of backside power rails may connect the cells to a second layer of backside power rails. The second layer of backside power rails may be global (e.g., connect to cells in floorboards positioned across different regions of a chip fabric) rather than local like the first layer of backside power rails. The backside power rails in the first layer may be orthogonal to the backside power rails in the second layer. In the example of FIG. 8, a BPR is connected directly to a first backside VSS and another BPR is connected directly to a first backside VDD. The first backside VSS is local, and a via connects the first backside VSS to a second backside VSS, which is global. In the example of FIG. 9A, TSVs are used to connect one BPR to a first backside VSS and a second backside VSS. The first backside VSS is local, and the second backside VSS is a global backside power rail. Another TSV is used to connect another BPR to a first backside VDD, which is local. In the example of FIG. 9B, the BPRs are connected to the backside power rails and straps by a backside VSS via and a backside VDD via, which are local. The backside VSS via connects the BPR to a backside VSS, which is global.

Figure 10:
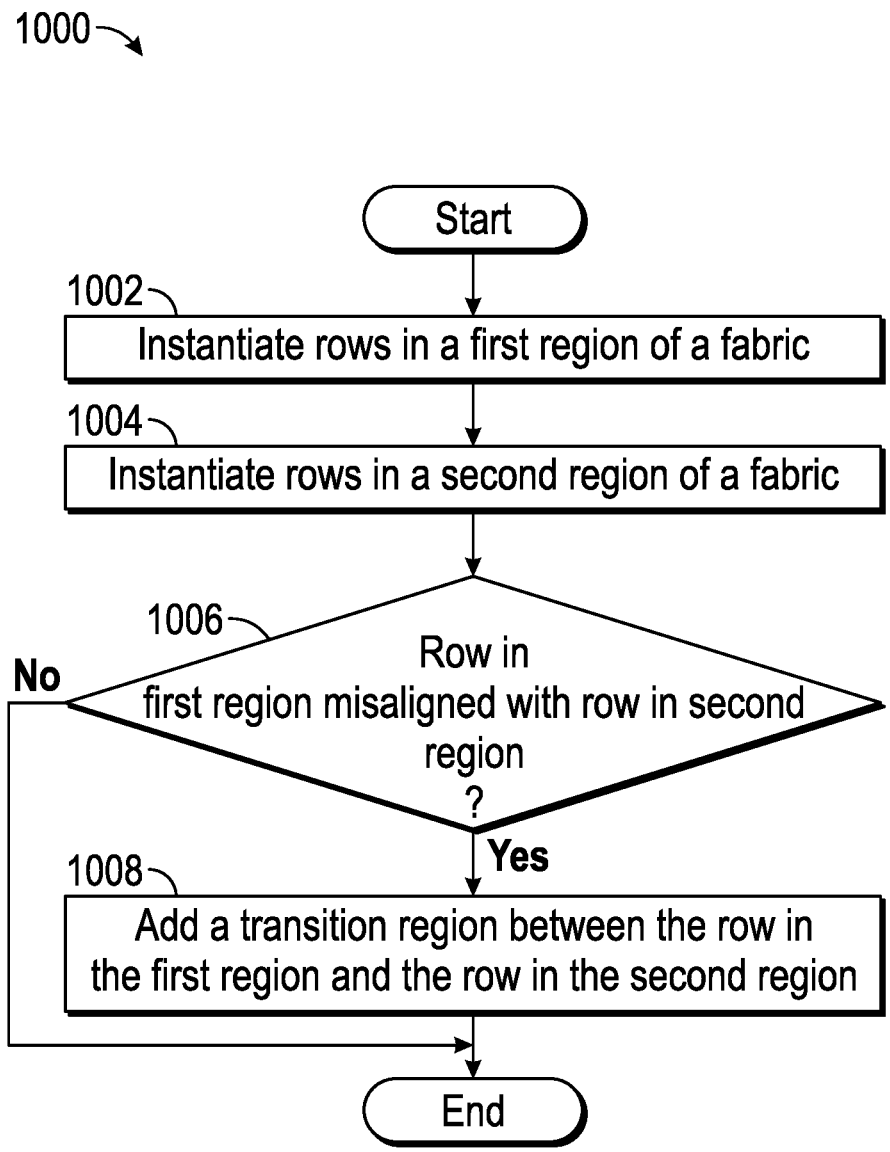
FIG. 10 is a flowchart of an example method, in accordance with an embodiment of the present disclosure.

FIG. 10 is a flowchart of an example method 1000, in accordance with an embodiment of the present disclosure. In certain embodiments, a computer system (e.g. the computer system 1200 of FIG. 12) performs the method 1000. By performing the method 1000, the computer system implements a customizable fabric that allows mixing of different height cells in the same logic block.

At 1002, the computer system instantiates rows in a first region of a fabric. The first region may have a height equal to a sum of the heights of the rows instantiated in the first region. At 1004, the computer system instantiates rows in a second region of the fabric. The second region may be next to the first region (e.g., horizontally adjacent to the first region). Additionally, the second region may have a height equal to a sum of the heights of the rows instantiated in the second region.

At 1006, the computer system determines whether a row instantiated in the first region is misaligned with a row instantiated in the second region. For example, the computer system may determine whether a row in the first region partially overlaps with a row in the second region. As another example, the computer system may determine whether a row in the second region partially overlaps with a row in the first region. If the rows in the first region are aligned with the rows in the second region, then the computer system concludes the method 1000. If a row in the first region is misaligned with a row in the second region, then the computer system adds a transition region between the row in the first region and the row in the second region to separate the rows from each other. Correspondingly, the computer system may remove a transition region between rows in different regions of the fabric if the computer system determines that the rows are aligned. After the rows and transition regions are set, the computer system may instantiate circuit components (e.g., transistors) into the rows.

Figure 11:
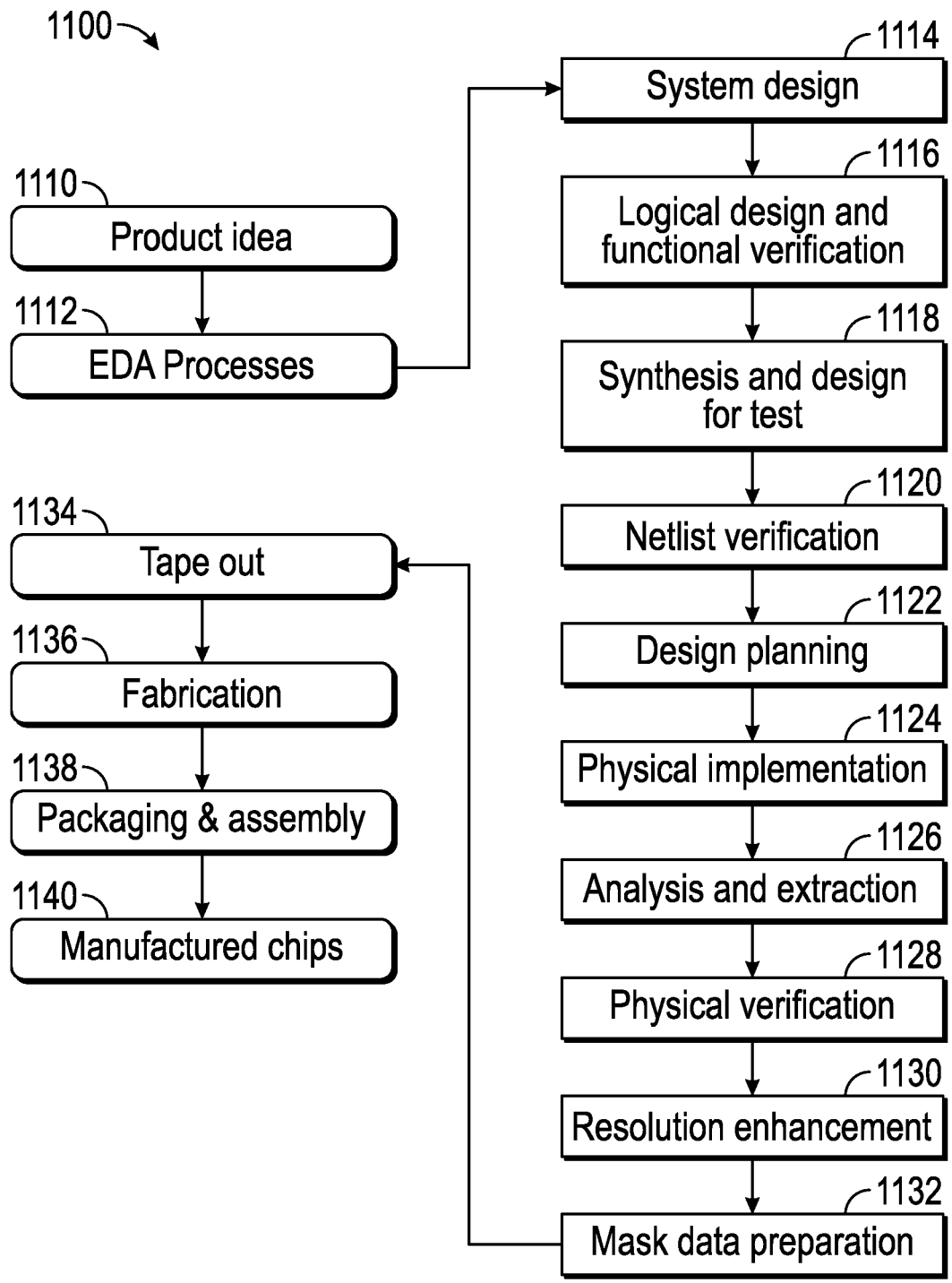
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

Figure 12:
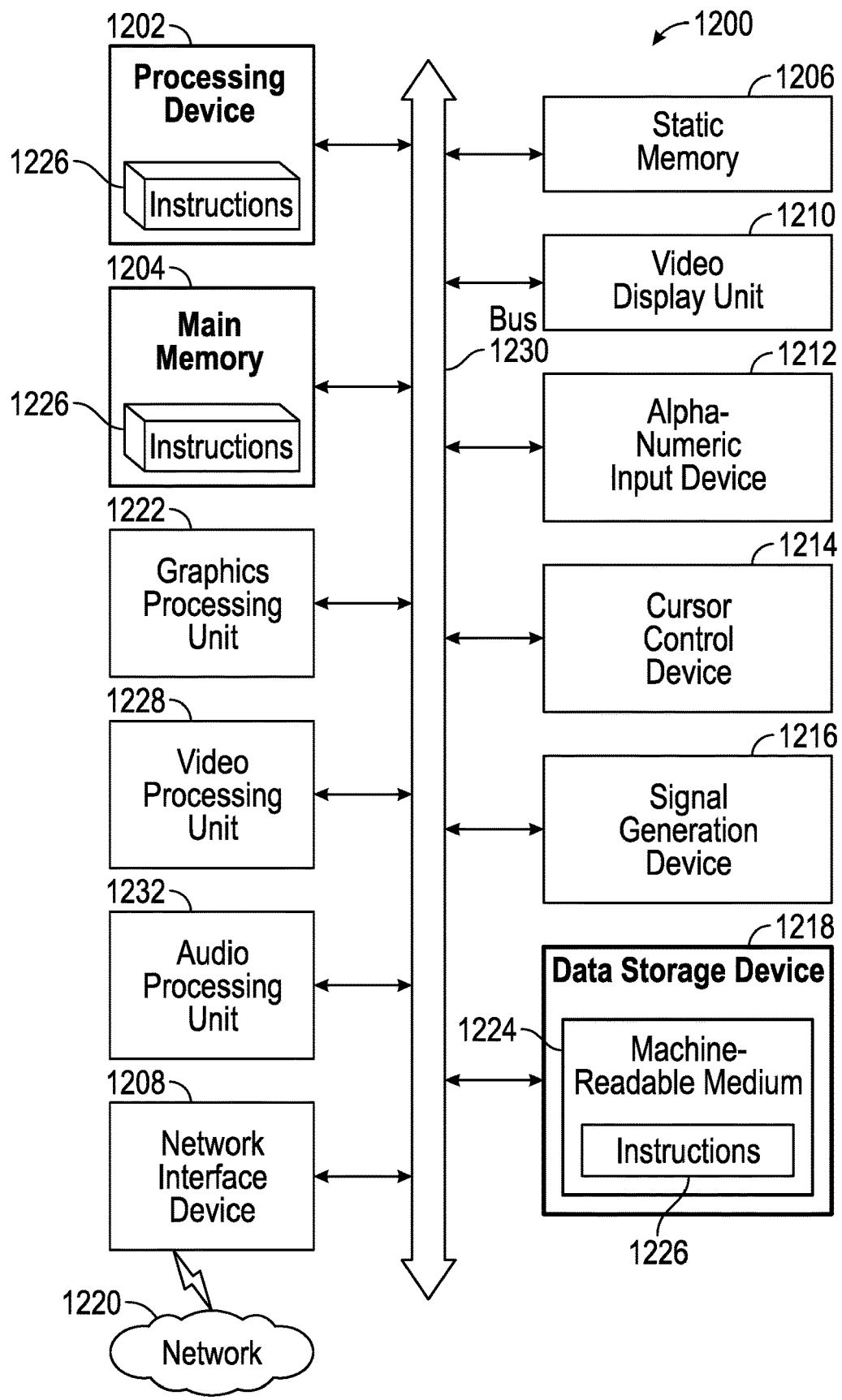
FIG. 12 depicts an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for designing a chip fabric comprising:
   instantiating a first plurality of rows in a first region of a fabric, the first region having a height corresponding to a sum of heights of the first plurality of rows;
   instantiating a second plurality of rows in a second region of the fabric, the second region horizontally adjacent to the first region in the fabric, the second region having a height corresponding to a sum of heights of the second plurality of rows;
   determining, by a processing device, whether a row of the first plurality of rows is misaligned with a row of the second plurality of rows;
   adding a transition region between the row of the first plurality of rows and the row of the second plurality of rows in response to determining that the row of the first plurality of rows is misaligned with the row of the second plurality of rows; and
   removing a transition region between a set of rows in the first region and a set of rows in the second region in response to a determination that the set of rows in the first region and the set of rows in the second region are aligned.

2. The method of claim 1, wherein the height of the second region is at least twice the height of the first region, and wherein a first set of rows of the first plurality of rows in a first portion of the second region have a first width and a second set of rows of the first plurality of rows in a second portion of the second region have a second width different from the first width.

3. The method of claim 2, wherein a height of the first portion of the second region is equal to the height of the first region.

4. The method of claim 1, further comprising instantiating a third plurality of rows in a third region of the fabric, the third region above the second region in the fabric, the third region having a height equal to the height of the first region.

5. The method of claim 4, wherein a row of the third plurality of rows and a row of the second plurality of rows have different heights.

6. The method of claim 1, further comprising instantiating a set of transistors into the first plurality of rows.

7. The method of claim 1, wherein the height of the second region is an integral multiple of the height of the first region.

8. The method of claim 1, wherein the row of the first plurality of rows has a height that is different from a height of the row of the second plurality of rows.

9. The method of claim 1, wherein a first cell in a first row of the first plurality of rows is arranged to connect to a global power rail using a power rail local to the first plurality of rows, and wherein a second cell in a second row of the second plurality of rows is arranged to connect to the global power rail using a power rail local to the second plurality of rows.

10. A system for designing a chip fabric comprising:
    a memory; and
    a hardware processor communicatively coupled to the memory, the hardware processor configured to:
      instantiate a first plurality of rows in a first region of a fabric, the first region having a height corresponding to a sum of heights of the first plurality of rows;
      instantiate a second plurality of rows in a second region of the fabric, the second region horizontally adjacent to the first region in the fabric, the second region having a height corresponding to a sum of heights of the second plurality of rows;

determine, by a processing device, whether a row of the first plurality of rows is misaligned with a row of the second plurality of rows;

add a transition region between the row of the first plurality of rows and the row of the second plurality of rows in response to determining that the row of the first plurality of rows is misaligned with the row of the second plurality of rows; and remove a transition region between a set of rows in the first region and a set of rows in the second region in response to a determination that the set of rows in the first region and the set of rows in the second region are aligned.

11. The system of claim 10, wherein the height of the second region is at least twice the height of the first region, and wherein a first set of rows of the first plurality of rows in a first portion of the second region have a first width and a second set of rows of the first plurality of rows in a second portion of the second region have a second width different from the first width.

12. The system of claim 11, wherein a height of the first portion of the second region is equal to the height of the first region.

13. The system of claim 10, wherein the hardware processor is further configured to instantiate a third plurality of rows in a third region of the fabric, the third region above the second region in the fabric, the third region having a height equal to the height of the first region.

14. The system of claim 13, wherein a row of the third plurality of rows and a row of the second plurality of rows have different heights.

15. The system of claim 10, wherein the hardware processor is further configured to instantiate a set of transistors into the first plurality of rows.

16. The system of claim 10, wherein the height of the second region is an integral multiple of the height of the first region.

17. The system of claim 10, wherein the row of the first plurality of rows has a height that is different from a height of the row of the second plurality of rows.

18. A non-transitory computer readable medium storing instructions that, when executed by a processor, cause the processor to perform an operation for designing a chip fabric, the operation comprising:

instantiating a first plurality of rows in a first region of a fabric;

instantiating a second plurality of rows in a second region of the fabric horizontally adjacent to the first region in the fabric;

determining whether a row of the first plurality of rows is misaligned with a row of the second plurality of rows;

adding a transition region between the row of the first plurality of rows and the row of the second plurality of rows in response to determining that the row of the first plurality of rows is misaligned with the row of the second plurality of rows; and removing a transition region between a set of rows in the first region and a set of rows in the second region in response to a determination that the set of rows in the first region and the set of rows in the second region are aligned.

* * * * *